United States Patent [19]

Abo

[11] 4,233,947
[45] Nov. 18, 1980

[54] EXHAUST GAS RECIRCULATION SYSTEM HAVING A SOLENOID DUTY COMPENSATION CIRCUIT FOR AN INTERNAL COMBUSTION ENGINE

[75] Inventor: Toshimi Abo, Yokohama, Japan

[73] Assignee: Nissan Motor Company, Limited, Yokohama, Japan

[21] Appl. No.: 55,758

[22] Filed: Jul. 9, 1979

[30] Foreign Application Priority Data

Aug. 25, 1978 [JP] Japan .................................. 53-102949

[51] Int. Cl.³ .......................... F02M 25/06; F07B 3/00
[52] U.S. Cl. .................................................... 123/571
[58] Field of Search ........ 123/119 A, 119 EC, 32 EA

[56] References Cited

U.S. PATENT DOCUMENTS

| | | | |
|---|---|---|---|
| 3,799,133 | 3/1974 | Frank | 123/119 A |
| 3,963,011 | 6/1976 | Saito et al. | 123/119 A |
| 4,040,397 | 8/1977 | Leichle | 123/32 EA |
| 4,140,084 | 2/1979 | Di Nunzio | 123/119 EC |
| 4,168,683 | 9/1979 | Hata et al. | 123/119 A |

*Primary Examiner*—Wendell E. Burns
*Attorney, Agent, or Firm*—Schwartz, Jeffery, Schwaab, Mack, Blumenthal & Koch

[57] ABSTRACT

The duty cycle of a driving pulse signal applied to an electromagnetic valve which controls the recirculation rate of the exhaust gas of an internal combustion engine, is compensated for by a compensation signal produced in accordance with the difference of the voltage of the power supply and a predetermined voltage so that the actual working period of the electromagnetic valve is adjusted optimally irrespectively of the deviation of the voltage of the power supply from the predetermined voltage, thereby providing the most suitable recirculation rate of the exhaust gas.

9 Claims, 8 Drawing Figures

EXHAUST GAS RECIRCULATION SYSTEM HAVING A SOLENOID DUTY COMPENSATION CIRCUIT FOR AN INTERNAL COMBUSTION ENGINE

FIELD OF THE INVENTION

This invention generally relates to an exhaust gas recirculation system for an internal combustion engine. More particularly, this invention relates to an electronic control circuit for controlling the recirculation rate of the exhaust gas.

BACKGROUND OF THE INVENTION

In some conventional exhaust gas recirculation systems for an internal combustion engine, the rate of exhaust gas to be recirculated is controlled by an electromagnetic valve responsive to a driving pulse signal, where the duty cycle of the driving pulse signal is controlled in accordance with various engine parameters such as the flow rate of the intake air of the engine, and the rotational speed of the crankshaft of the engine.

As the power source of the driving pulse signal, a battery is usually used. If the voltage of the battery is constant, the flow rate of the gas is proportionally controlled via the electromagnetic valve in accordance with the calculated duty cycle of the driving pulse signal. However, the voltage of the battery is apt to vary in a considerably wide range. When the voltage of the driving pulse signal of the electromagnetic valve varies, the response of the electromagnetic valve varies accordingly. In other words, the actual duty cycle of the operation (the period of time for which the valve opens with respect to the duration of one cycle of open and close states) of the electromagnetic valve does not correspond with the duty cycle of the driving pulse signal. This means that, when the voltage of the power supply is different from the standard voltage thereof, the recirculation rate of the exhaust gas differs from a desired rate which is expected, although the duty cycle of the driving pulse signal is correctly controlled.

SUMMARY OF THE INVENTION

This invention has been achieved to overcome the above described drawback of the conventional exhaust gas recirculation system.

It is, therefore, an object of the present invention to provide an exhaust gas recirculation system for an internal combustion engine, in which the recirculation rate of the exhaust gas is optimally controlled irrespectively of the variation of the voltage of the power supply.

Another object of the present invention is to provide such a system in which the opening duration of the valve head of an electromagnetic valve is compensated for by controlling the duty cycle of the driving pulse signal in accordance with the difference between a predetermined voltage and the actual voltage of the power supply.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Figure 1:
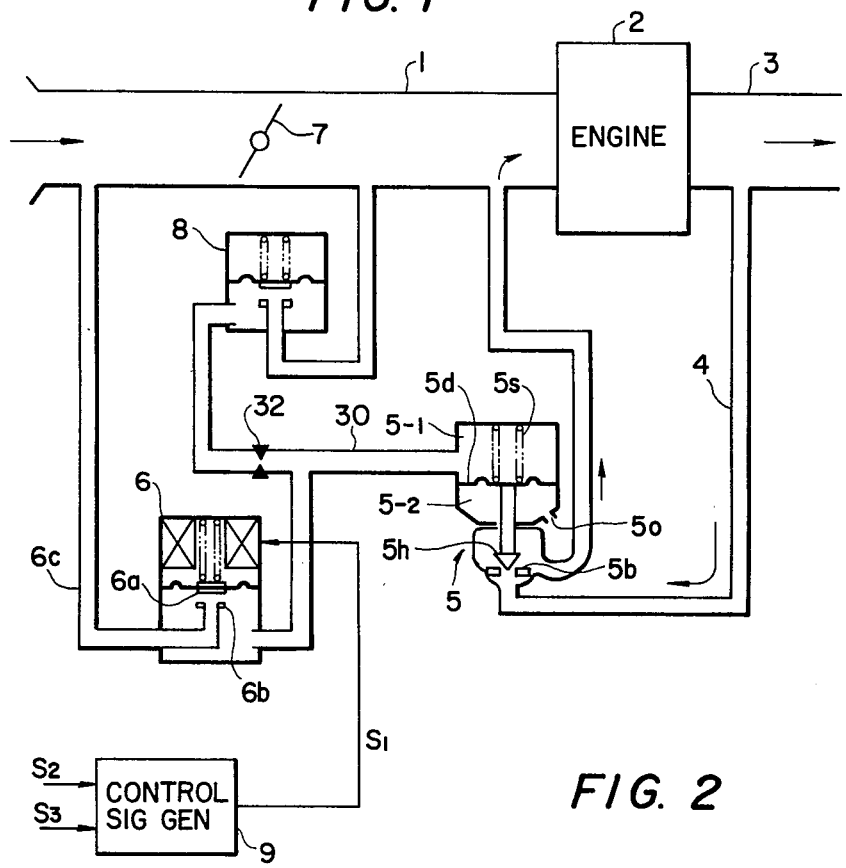
FIG. 1 shows a schematic view of the exhaust gas recirculation system according to the present invention.

Prior to the description of the preferred embodiments, a general idea of an exhaust gas recirculation system for an internal combustion engine is discussed. In FIG. 1, an exhaust gas recirculation (which will be referred to as EGR hereinafter) system is shown. It is to be noted that FIG. 1 is intended to show both of a known EGR system and a novel EGR system according to the present invention since the novel feature of the present invention resides in the control signal generator 9 which is shown as a black box.

An internal combustion engine 2 has an intake passage 1, and an exhaust passage 3. A throttle flap 7 is disposed in the intake passage 1 to control the flow rate of the intake air. A recirculation passage 4 is provided to fluidly connect the exhaust passage 3 to the intake passage 1. An EGR control valve assembly 5 is interposed in the EGR passage 4 to control the recirculation rate of the exhaust gas. The EGR control valve assembly 5 has first and second chambers 5-1 and 5-2 arranged in opposite sides with respect to a diaphragm 5d. The diaphragm 5d is normally biased downwardly by the force of a spring 5s. The second chamber 5-2 of the EGR control valve assembly 5 is communicated with the atmosphere via an opening 5o. A valve head 5h is fixedly connected via a rod to the diaphragm 5d and is arranged to abut on a valve seat 5b when biased downwardly so that the valve head 5h controls the amount of recirculation gas. The first chamber 5-1 is communicated with the intake passage 1 via a conduit 30 and a constant pressure valve 8. An orifice 32 is provided in the conduit 30. The constant pressure valve 8 is provided to produce a constant vacuum pressure from the vacuum prevailing in the intake passage 1 downstream of the throttle flap 7. The orifice 32 is provided to reduce the vacuum pressure obtained by the constant pressure valve 8 in a manner that the EGR control valve assembly 5 actuates in the best working range in view of the control vacuum pressure to flow rate characteristic of the EGR control valve assembly 5. The conduit 30 is communicated via an electromagnetic (solenoid) valve 6 with the atmosphere. The electromagnetic valve 6 has a valve head 6a disposed on a movable member which is arranged to move up and down in response to a driving pulse signal $S_1$ applied to the winding of the electromagnetic valve 6. The valve head 6a is arranged to abut on a valve seat 6b arranged at the end of a conduit 6c communicating with the atmosphere. In this shown example, the conduit 6c extending from the electromagnetic valve 6 is communicated with the intake passage 1 upstream of the throttle flap 7 to induce the atmospheric pressure. The electromagnetic valve 6 has a chamber communicating with the conduit 30. With this arrangement, the vacuum in the conduit 30 is diluted by the atmospheric pressure to an extent defined by the ON/OFF ratio of the electromagnetic valve 6. The ON/OFF ratio of the operation of the electromagnetic valve 6 is controlled by the duty cycle of the driving pulse signal $S_1$. Accordingly, the pressure in the first chamber 5-1 of the EGR control valve assembly 5 is controlled in turn.

The control signal generator 9 is responsive to two signals $S_2$ and $S_3$ respectively indicative of the flow rate of the intake air and the engine rotational speed. The control signal generator 9 may be a microcomputer and is arranged to produce the driving pulse signal $S_1$ in accordance with these input signals $S_2$ and $S_3$. The microcomputer calculates an optimal recirculation rate of the exhaust gas in view of these engine parameters. The duty cycle of the dirving pulse signal $S_1$ is controlled by the microcomputer so as to result in the optimal recirculation rate.

Figure 2:
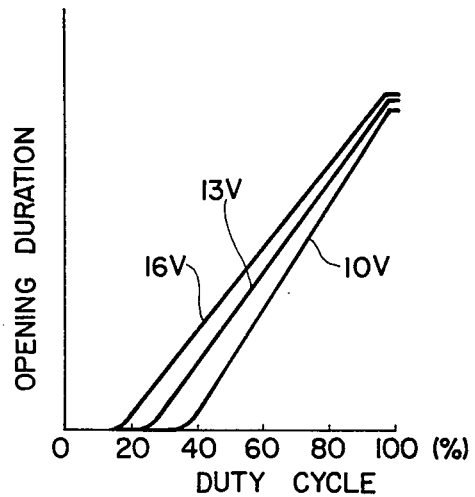
FIG. 2 is a graphical representation showing the relationship between the duty cycle of the driving pulse signal and the opening duration of the electromagnetic valve shown in FIG. 1.

FIG. 2 shows the opening duration characteristics of the electromagnetic valve 6 with respect to the voltage of the driving pulse signal $S_1$. Since the driving current of the electromagnetic valve 6 is derived from a suitable power source, such as a battery, the voltage of the driving pulse signal sometimes varies undesirably. As shown in FIG. 2, the duration of opening of the electromagnetic valve 6 varies as the voltage of the driving pulse signal $S_1$ varies even though the duty cycle of the driving pulse signal $S_1$ is maintained constant.

The reason for this variation in opening duration of the electromagnetic valve 6 is that there is a time delay in the operation of the movable member in the electromagnetic valve 6. If the electromagnetic valve 6 is of the type that the valve head thereof opens upon energization of the winding and closes by the force of spring upon deenergization, the time delay at the initial stage of the opening of the valve head increases as the voltage of the driving pulse signal $S_1$ decreases (the illustrated electromagnetic valve 6 is of this type). On the other hand, if the electromagnetic valve 6 is of the type that the valve head closes upon energization of the winding and opens by the force of spring upon deenergization, the time delay at the initial stage of the closing of the valve head increases as the voltage of the driving pulse signal decreases. In the former case, therefore, the duration for which the valve head opens becomes shorter as the voltage decreases, and in the latter case, the duration for which the valve head opens becomes longer as the voltage decreases.

Since the power supply used for various electronical equipment in a motor vehicle is a battery, the voltage of the driving pulse signal is apt to vary in a considerably wide range. For instance, it is possible for the voltage of the battery to vary from 10 to 16 volts when normally used. As shown in FIG. 2, the opening duration of the electromagnetic valve 6 varies as the voltage of the driving pulse signal $S_1$, i.e. the voltage of the battery, varies as 10-13-16 volts.

In order to eliminate the disadvantages due to the variation in opening duration in accordance with the variation of the voltage of the power supply, it is possible to maintain the voltage of the driving pulse signal $S_1$ constant by means of a constant voltage circuit. However, this method is not practical for the following reason. The reason is that since the required current by the electromagnetic valve 6 is relatively large, such as 0.5 ampere, while the variation range of the voltage of the power supply is wide, the loss in power in a constant voltage circuit is great and accordingly much heat is generated therein.

Figure 3A:
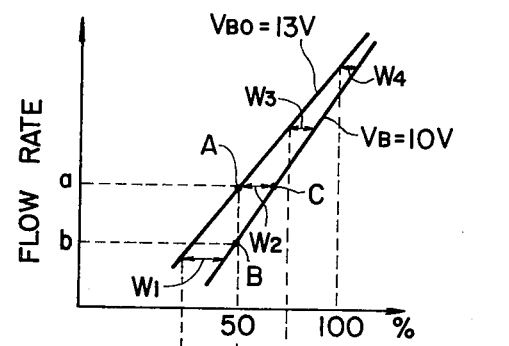
FIG. 3A to FIG. 3D are graphical representations useful for understanding the idea of compensation of duty cycle of the driving pulse signal applied to the electromagnetic valve shown in FIG. 1.

Referring to FIG. 3A, a graphical representation of the relationship between the duty cycle and the flow rate of the recirculation gas is shown. It is assumed that the standard voltage of the power supply is 13 volts. As shown when the duty cycle of the driving pulse signal $S_1$ is 50 percent, the flow rate is at "a". However, if the voltage of the power supply falls to 10 volts, the flow rate becomes "b" which is below the flow rate "a" (see points A and B on the two lines). In order to obtain the flow rate "a", without changing the voltage of the power supply, the duty cycle of the driving pulse signal has to be increased as much as $W_2$ (see point C). The change in duty cycle will be referred to as compensation of duty cycle hereinafter. In FIG. 3A, the amounts of duty cycle to be compensated for at various values of duty cycle to obtain a required flow rate of the recirculation gas are indicated by references $W_1$ to $W_4$.

Figure 3B:
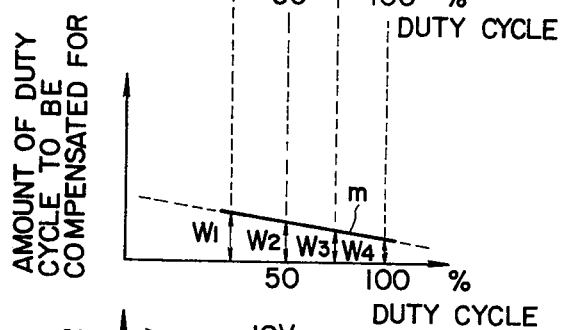

In FIG. 3B, the relationship between the duty cycle and the amount of duty cycle to be compensated for is shown. The line "m" shows the difference in duty cycle for obtaining the same flow rate by the two voltages (13 volts and 10 volts) of the power supply.

Figure 3C:
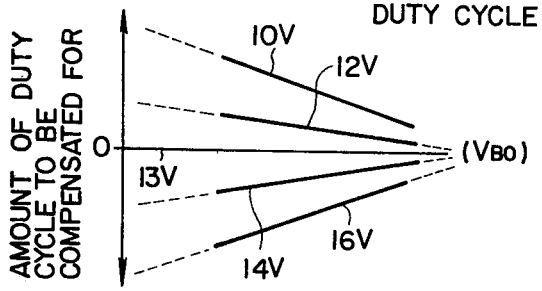

In FIG. 3C, the relationships between the duty cycle and the amount of duty cycle to be compensated for are shown with respect to various voltages of the power supply. Since it is assumed that 13 volts is the standard voltage of the power supply, the abscissa of the graph corresponds to 13 volts. From FIG. 3C it is possible to find a general formula to find the amount of duty cycle to be compensated for as a function of the duty cycle.

It is assumed that the slope of the line showing the relationship between the duty cycle and the amount of duty cycle to be compensated for is $\alpha$, when the voltage difference between the standard voltage $V_{BO}$ and the actual voltage $V_B$ of the power supply is one volt. If the amount of duty cycle to be compensated for when the duty cycle is 100 percent, is expressed in terms $\beta$, the amount Y of duty cycle to be compensated for is generally expressed by the following equation, wherein X is the duty cycle of the driving pulse signal $S_1$.

$$Y = [\alpha(100-X) + \beta] \cdot (V_{BO} - V_B) \tag{1}$$

Since the value of $V_B$ can be measured, and the values of $\alpha$ and $\beta$ are respectively obtained from an experiment, the value of Y is obtained as a function of duty cycle X and the voltage $V_B$ of the power supply. In other words, the values of $\alpha$, $\beta$, and $V_{BO}$ are treated as constant values, while the values of X and $U_B$ are variables in the above formula.

Figure 3D:
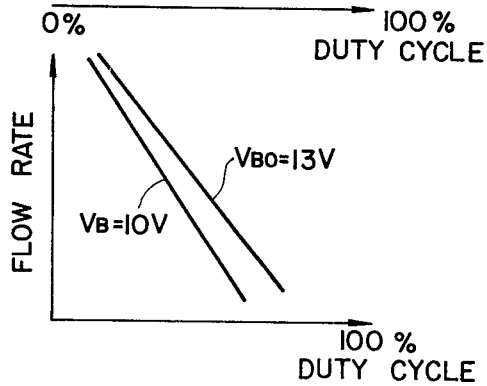

The above equation (1) is applied when the electromagnetic valve 6 is of the type that the valve head opens upon energization. If the electromagnetic valve 6 is of the type that the valve head closes upon energization, the amount of duty cycle to be compensated for will be expressed by the following equation (2), since the relationship between the duty cycle and the flow rate of the recirculation gas is shown by the graphical representation of FIG. 3D.

$$Y = -(\alpha X + \beta) \cdot (V_{BO} - V_B) \tag{2}$$

Figure 4:
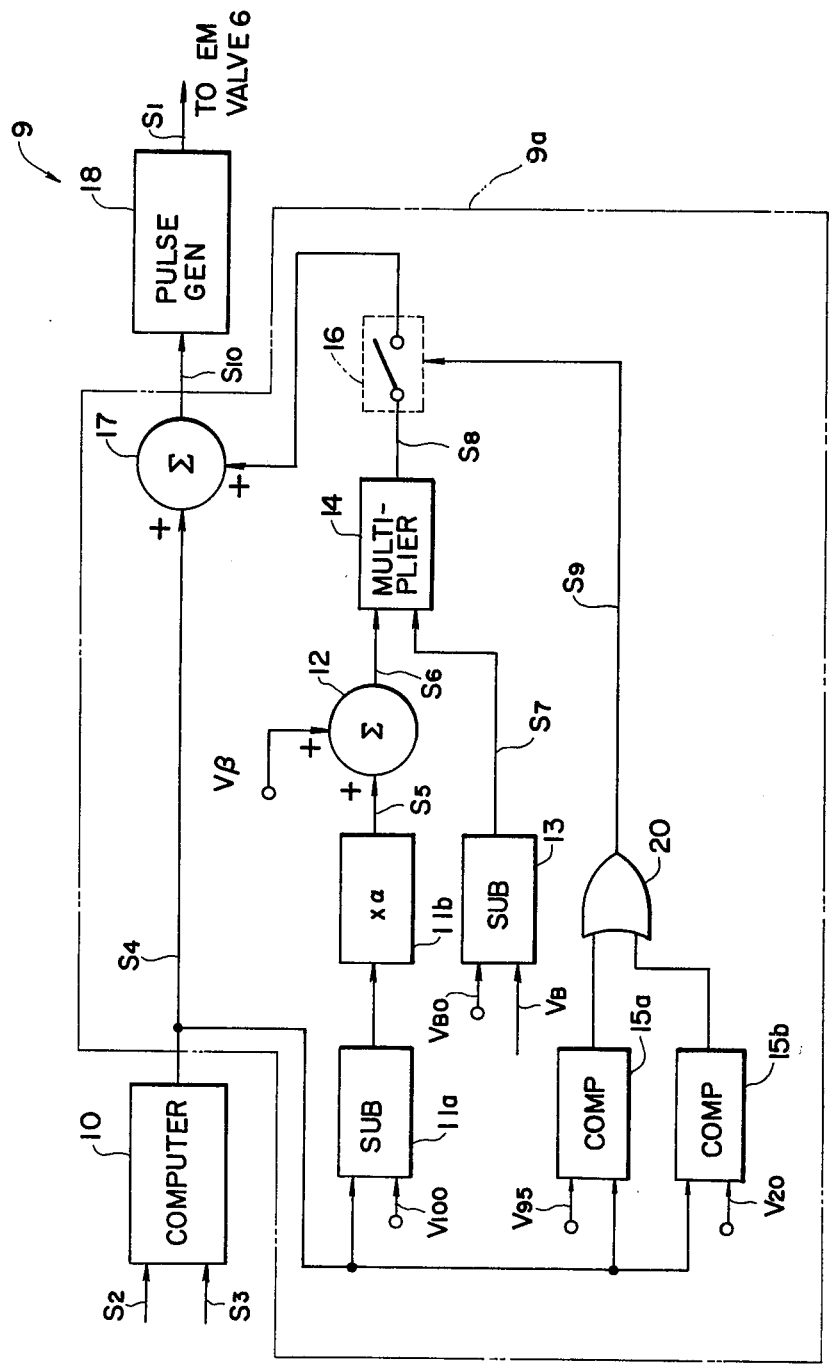
FIG. 4 shows a schematic block diagram of a first preferred embodiment of the control signal generator shown in FIG. 1.

Reference is now made to FIG. 4 which shows a schematic block diagram of a control signal generator used in a first preferred embodiment of the exhaust gas recirculation system according to the present invention. The control signal generator shown in FIG. 4 is used in place of the control signal generator 9 shown in FIG. 1. The control signal generator comprises a computing circuit 10 which is of a conventional type, a first subtractor 11a, a first multiplier 11b, a first adder 12, a second subtractor 13, a second multiplier 14, a switching circuit 16, a second adder 17, a pulse generator 18, first and second comparators 15a and 15b, and an OR gate 20. The computing circuit 10 is responsive to at least two input signals $S_2$ and $S_3$ respectively indicative of the flow rate of the intake air and the rotational speed of the crankshaft of the engine 2. The flow rate of the intake air may be derived from a conventional airflow meter (not shown), while the rotational speed of the engine may be derived from a suitable tacho generator (not shown). The computing circuit 10 produces an output analogue signal $S_4$ indicative of the duty cycle of a driving pulse signal which will be fed to the electromagnetic valve 6 shown in FIG. 1.

It is to be noted that if the control signal generator 9 had only the computing circuit 10 and the pulse generator 18, and thus the pulse generator 18 produced the driving pulse signal $S_1$ in accordance with the output signal $S_4$ of the computing circuit 10, the control signal generator 9 would be the same as the conventional one. In other words, according to the present invention, the output signal $S_4$ of the computing circuit 10 is not directly fed to the pulse generator 18, but via the second adder 17, in which the magnitude of the output signal $S_4$ of the computing circuit 10 is modified by a suitable compensation signal. In order to perform such compensation, the control signal generator 9 is provided with the circuitry 9a enclosed by a chain line in addition to the conventional computing circuit 10 and the also conventional pulse generator 18. The circuitry 9a enclosed by the chain line may be called a compensation circuit.

The output of the computing circuit 10 is connected to a first input of the second adder 17 and to a first input of the first subtractor 11a. The first subtractor 11a has a second input for receiving a first reference signal $V_{100}$ the voltage of which corresponds to a duty cycle of 100 percent. The first subtractor 11a produces a signal indicative of the difference between the two input signals by subtracting the value of the signal $V_{100}$ from the value of the other signal $S_4$. The output of the first subtractor 11a is connected to an input of the first multiplier 11b in which the difference obtained by the first subtractor 11a is multiplied by a predetermined (constant) value which corresponds to the before mentioned $\alpha$. Since the value of $\alpha$ is constant, this step of multiplication may be performed by simply amplifying the difference by a predetermined amplification degree $\alpha$. In other words, the first multiplier 11b may be an amplifier. The first multiplier 11b therefore, produces an output signal $S_5$ which will be expressed in the following equation:

$$S_5 = \alpha(100-X)$$

The output of the first multiplier 11b is connected to a first input of the first adder 12 which has a second input. The second input of the first adder 12 is responsive to a second reference voltage $V_\beta$ which corresponds to the before mentioned $\beta$. The first adder 12 produces an output signal $S_6$ which will be expressed by the following equation.

$$S_6 = \alpha(100-X)+\beta$$

The above mentioned two values $\alpha$ and $\beta$, which are constant, are obtained by experiments. Once these values are obtained, these values are respectively preset by adjusting the amplification degree of the amplifier used in place of the first multiplier 11b or the multiplication factor of the first multiplier 11b and the voltage of the second reference voltage $V_\beta$.

The second subtractor 13 has first and second inputs respectively responsive to a third reference voltage $V_{BO}$, while the second input is responsive to the voltage $V_B$ of the power supply such as the battery (not shown). It will be readily understood that the above mentioned first, second and third reference voltages $V_{100}$, $V_\beta$, and $V_{BO}$ may be produced by suitable voltage dividers (not shown). The second subtractor 13 produces an output signal $S_7$ indicative of the difference between the two input voltages $V_{BO}$ and $V_B$ by subtracting the voltage $V_B$ of the power supply from the predetermined voltage $V_{BO}$. The voltage of the output signal $S_7$ of the second subtractor 13 will be expressed by the following equation.

$$S_7 = V_{BO} - V_B$$

The second multiplier 14 is responsive to the output signals $S_6$ and $S_7$ of the first adder 12 and the second subtractor 13 to produce an output signal $S_8$ by multiplying $S_6$ by $S_7$. The output signal $S_8$ of the second multiplier 14 will be expressed by the following equation.

$$S_8 = [\alpha(100-X)+\beta] \cdot (V_{BO} = V_B)$$

It will be seen that the value indicated by the signal $S_8$ corresponds to the value expressed by the equation (1). This signal $S_8$ is fed via the switching circuit 16 to the second input of the second adder 17 in which the signal $S_8$ is added to the analogue signal $S_4$ from the computing circuit 10. Since two voltages $S_4$ and $S_8$ are added to each other, if the voltage of the signal $S_8$ is positive, the voltage of the signal $S_4$ increases. On the other hand, if the voltage of the signal $S_8$ is negative, the voltage of the signal $S_4$ decreases. The second adder 17 produces an output signal $S_{10}$ indicative of the sum of the two voltages of the signals $S_4$ and $S_8$. This output signal $S_{10}$ is supplied to the pulse generating circuit 18 in which a driving pulse signal $S_1$, the voltage of which equals the voltage $V_B$ of the power supply, is produced. The duty cycle of the driving pulse signal $S_1$ is controlled in accordance with the voltage of the signal $S_{10}$. It will be understood that since the voltage of the signal $S_4$ is modified by the voltage of the signal $S_8$, the duty cycle of the driving pulse signal $S_1$ is corrected or compensated for.

In the above it is assumed that the switching circuit 16 is closed to transmit the output signal $S_8$ to the second adder 17. However, actually the switching circuit 16 is controlled by a signal $S_9$ applied from the OR gate 20. As shown in FIG. 2, although the linearity of the flow rate characteristic of the electromagnetic valve 6 is high in a duty cycle range between about 20 percent and about 95 percent, both in the range above 95 percent and in the range below 20 percent the electromagnetic valve 6 has poor linearity. Therefore, compensation of the duty cycle may result in undesirable excursion of the flow rate of the exhaust gas. For this reason it is advantageous to disable the function of compensation when the duty cycle indicated by the analogue signals S4 is off a predetermined range. The signal S9 is arranged to assume high and low voltages in accordance with the duty cycle indicated by the analogue signal S4 so that the transmission of the output signal S8 of the second multiplier 14 is controlled in turn.

It will be described hereinbelow how this signal S9 is produced. The output of the computing circuit 10 is connected to a second input of the first comparator 15a and to a first input of the second comparator 15b. The first comparator 15a has a first input responsive to a predetermined voltage $V_{95}$ corresponding to a duty cycle of 95 percent, while the second comparator 15b has a second input responsive to a predetermined voltage $V_{20}$ corresponding to a duty cycle of 20 percent. The first comparator 15a produces a high level output signal when the voltage of the signal S4 is above the predetermined voltage $V_{95}$, while the second comparator 15b produces a high level output signal when the voltage of the signal S4 is below the predetermined voltage $V_{20}$. These output signals of the first and second comparators 15a and 15b are fed via the OR gate 20 to the switching circuit 16, which may be a relay or a gate circuit. The switching circuit 16 is arranged to become off (open) when the signal S8 of the multiplier 14 is supplied to the second adder 17 only when the duty cycle indicated by the output signal S4 of the computing circuit 10 resides between 20 percent and 95 percent. In other words, the modification (compensation) of duty cycle is performed only when the duty cycle is between 20 percent and 95 percent.

In the above described first embodiment of the EGR system according to the present invention, the duty cycle of the driving pulse signal S1 is compensated for in accordance with the difference between the voltage $V_B$ of the power supply and the predetermined voltage $V_{BO}$. In other words, the amount of duty cycle to be compensated for is in proportion at a given rate to the difference in voltage irrespectively of whether the actual voltage $V_B$ is greater or smaller than the predetermined voltage $V_{BO}$.

However, according to experiments, it has been recognized that the amount of change in flow rate caused by the voltage difference is larger in case that the voltage $V_B$ of the power supply is below the predetermined voltage $V_{BO}$ than that in case that the voltage $V_B$ of the power supply is greater than the predetermined voltage $V_{BO}$. This means that it is advantageous to change the amount of duty cycle to be compensated for in accordance with the fact that the voltage $V_B$ of the power supply is greater to smaller than the predetermined voltage $V_{BO}$.

Figure 5:
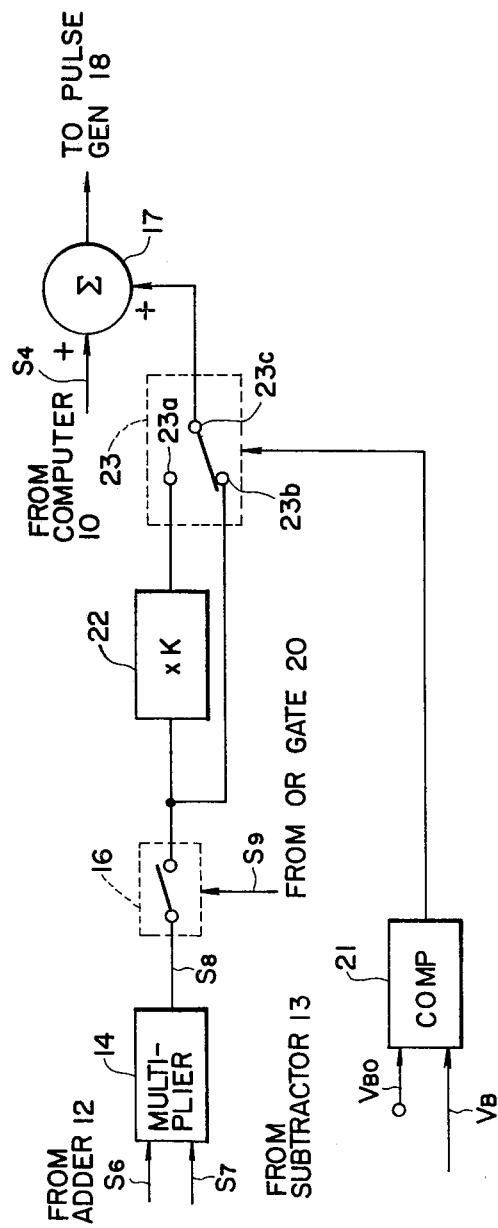
FIG. 5 shows a schematic block diagram of a second preferred embodiment of the control signal generator shown in FIG. 1.

Hence, the following second embodiment. FIG. 5 illustrates a schematic block diagram of the control signal generator used in the second preferred embodiment of the EGR system according to the present invention. The same elements and circuits also used in the first embodiment shown in FIG. 1 are designated by the like references. The circuit arrangement of the control signal generator of the second embodiment includes all of the elements and circuits that are included in the first embodiment circuit shown in FIG. 1. The circuit arrangement of the second embodiment further comprises a comparator 21, a multiplier 22 (this multiplier will be referred to as a third multiplier hereinbelow), and a switching circuit 23. The comparator 21 is responsive to the predetermined voltage $V_{BO}$ and the actual voltage $V_B$ of the power supply to produce a high level output signal when the voltage $V_B$ of the power supply is below the predetermined voltage $V_{BO}$. The output of the switching circuit 16 is connected to an input of the third multiplier 22 the output of which is connected to a first stationary contact 23a of the switching circuit 23. The output of the switching circuit 16 is further connected to a second stationary contact 23b of the switching circuit 23. The switching circuit 23 has a movable contact 23c arranged to contact with the first or second stationary contact 23a or 23b in response to a signal from the comparator 21. Although the switching circuit 23 is shown to be a mechanical switch, such as a relay, an electronic gate circuit may be used instead. The movable contact 23c of the switching circuit 23 is connected to the second input of the second adder 17.

The switching circuit 23 is responsive to the output signal of the comparator 21 and is arranged to transmit the output of the switching circuit 16 directly to the adder 17 by contacting the movable contact 23c to the second stationary contact 23b when the output signal of the comparator 21 assumes a low level. On the other hand, if the voltage $V_B$ of the power supply is smaller than the predetermined voltage $V_{BO}$, the movable contact 23c is in contact with the first stationary contact 23a to transmit the output signal of the third multiplier 22 to the adder 17.

As described in connection with the first embodiment, the output signal S8 of the second multiplier 14 is expressed by the equation (1) or (2) depending on the type of the electromagnetic valve 6. This signal S8 is applied to the third multiplier 22 in which the voltage of the signal S8 is multiplied by a predetermined value K. A suitable amplifier may be used in place of the third multiplier 22 in the same manner as in the first multiplier 11b and the predetermined value K may be set by adjusting the amplification degree of the amplifier 22. From the foregoing, it will be understood that the output signal of the amplifier 22 may be expressed by the following equation (3) in case of the reception of the input signal S8 expressed by the equation (1) and by the other equation (4) in case of reception of the input signal S8 expressed by the equation (2).

$$Y = K[\alpha(100-X)+\beta)] \cdot (V_{BO}-V_B) \tag{3}$$

$$Y = -K(\alpha X+\beta) \cdot (V_{BO}-V_B) \tag{4}$$

The value of K which may be set by adjusting the amplification degree of the amplifier 22 may be obtained by means of experiments. It will be understood from the foregoing, that the amount of duty cycle to be compensated for is changed in accordance with the fact the voltage $V_B$ of the power supply is above or below the predetermined voltage $V_{BO}$. Consequently, the correction of the duty cycle in the second embodiment is more accurate than in the first embodiment.

Although the preferred embodiments of the EGR system according to the present invention are described that the control signal generator 9 is constructed by discrete elements as shown in FIG. 4 and FIG. 5, if a microcomputer is so programmed that it functions as the circuit arrangement shown in FIG. 4 and/or FIG. 5, the control signal generator 9 may be substituted with a microcomputer. Furthermore, the EGR system shown in FIG. 1 is an example for the explanation of the function of the control signal generator 9 according to the present invention, and therefore, other arrangements of an EGR system, in which the recirculation rate of the exhaust gas is controlled by an electromagnetic valve, may be used.

What is claimed is:

1. An exhaust gas recirculation system for an internal combustion engine, including an electromagnetic valve which controls the recirculation rate of the exhaust gas in response to a driving pulse signal the duty cycle of which is controlled by an output signal of a computing circuit, said computing circuit producing said output signal in accordance with engine parameters, wherein the improvement comprises:

means for modifying the duty cycle of said driving pulse signal in accordance with the deviation of the voltage of said driving pulse signal from a predetermined value.

2. An exhaust gas recirculation system as claimed in claim 1, wherein said modifying means comprises an electrical circuit which produces an output signal indicative of the amount of duty cycle to be compensated for, said signal being expressed by:

$$Y=[\alpha(100-X)+\beta]\cdot(V_{BO}-V_B)$$

wherein Y is the amount of duty cycle to be compensated for;
X is the precompensated duty cycle of said driving pulse signal;
$V_B$ is the voltage of said driving pulse signal;
$V_{BO}$ is a predetermined voltage;
$\alpha$ is the slope of a line in a graph showing the relationship between the duty cycle and the amount of duty cycle to be compensated for when the voltage difference between $V_{BO}$ and $V_B$ is one volt; and
$\beta$ is the amount of duty cycle to be compensated for when the duty cycle of said driving pulse signal is 100 percent in said graph.

3. An exhaust gas recirculation system as claimed in claim 1, wherein said modifying means comprises an electrical circuit which produces an output signal indicative of the amount of duty cycle to be compensated for, said signal being expressed by:

$$Y=-(\alpha X+\beta)\cdot(V_{BO}-V_B)$$

wherein Y is the amount of duty cycle to be compensated for;
X is the precompensated duty cycle of said driving pulse signal;
$V_B$ is the voltage of said driving pulse signal;
$V_{BO}$ is a predetermined voltage;
$\alpha$ is the slope of a line in a graph showing the relationship between the duty cycle and the amount of duty cycle to be compensated for when the voltage difference between $V_{BO}$ and $V_B$ is one volt; and
$\beta$ is the amount of duty cycle to be compensated for when the duty cycle of said driving pulse signal is 100 percent in said graph.

4. An exhaust gas recirculation system as claimed in claim 1, wherein said modifying means comprises an electrical circuit which produces an output signal indicative of the amount of duty cycle to be compensated for, said signal being expressed by: when $V_{BO}<V_B$ $$Y=[\alpha(100-X)+\beta]\cdot(V_{BO}-V_B)$$

and when $V_{BO}\geq V_B$ $$Y=K[\alpha(100-X)+\beta]\cdot(V_{BO}-V_B)$$

wherein Y is the amount of duty cycle to be compensated for;
X is the precompensated duty cycle of said driving pulse signal;
$V_B$ is the voltage of said driving pulse signal;
$V_{BO}$ is a predetermined voltage;
$\alpha$ is the slope of a line in a graph showing the relationship between the duty cycle and the amount of duty cycle to be compensated for when the voltage difference between $V_{BO}$ and $V_B$ is one volt; and
$\beta$ is the amount of duty cycle to be compensated for when the duty cycle of said driving pulse signal is 100 percent in said graph.

5. An exhaust gas recirculation system as claimed in claim 1, wherein said modifying means comprises an electrical circuit which produces an output signal indicative of the amount of duty cycle to be compensated for, said signal being expressed by: when $V_{BO}<V_B$ $$Y=-(\alpha X+\beta)\cdot(V_{BO}-V_B)$$

and when $V_{BO}\geq V_B$ $$Y=-K(\alpha X+\beta)\cdot(V_{BO}-V_B)$$

wherein Y is the amount of duty cycle to be compensated for;
X is the precompensated duty cycle of said driving pulse signal;
$V_B$ is the voltage of said driving pulse signal;
$V_{BO}$ is a predetermined voltage;
$\alpha$ is the slope of a line in a graph showing the relationship between the duty cycle and the amount of duty cycle to be compensated for when the voltage difference between $V_{BO}$ and $V_B$ is one volt; and
$\beta$ is the amount of duty cycle to be compensated for when the duty cycle of said driving pulse signal is 100 percent in said graph.

6. An exhaust gas recirculation system as claimed in claim 1, wherein said modifying means comprises:
(a) a first subtractor for producing a signal indicative of the difference between the voltage of said output signal of said computing circuit, indicative of the duty cycle of said driving pulse signal and a voltage indicative of a duty cycle of 100 percent;
(b) a second subtractor for producing a signal indicative of the difference between the voltage of said driving pulse signal and said predetermined voltage;
(c) a first multiplier responsive to the output signal of said first subtractor for multiplying said difference by a constant value;
(d) a first adder responsive to said first multiplier for adding a predetermined value to the output signal of said first multiplier;
(e) a second multiplier responsive to said second subtractor and said first adder for multiplying the voltages of the output signals thereof; and
(f) a second adder responsive to the output signal of said computing circuit and said second multiplier for adding the voltages of the output signals thereof to each other.

7. An exhaust gas recirculation system as claimed in claim 6, further comprising:

(a) a duty cycle detecting circuit for producing an output signal when the duty cycle indicated by the output signal of said computing circuit is out of a predetermined range; and (b) a switching circuit responsive to the output signal of said duty cycle detecting circuit for transmitting the output signal of said second multiplier to said second adder only when the duty cycle indicated by said computing circuit output signal is in said predetermined range.

8. An exhaust gas recirculation system as claimed in claim 7, wherein said duty cycle detecting circuit comprises:

(a) first and second comparators respectively responsive to the output signal of said computing circuit, said first comparator producing an output signal when the duty cycle is above a first predetermined value, said second comparator producing an output signal when the duty cycle is below a second predetermined value which is smaller than said first predetermined value; and (b) an OR gate responsive to the output signals of said first and second comparators.

9. An exhaust gas recirculation system as claimed in claim 6 or claim 7, further comprising:

(a) a comparator responsive to the voltage of said driving pulse signal and said predetermined voltage for producing an output signal when said voltage of said driving pulse signal has a predetermined relationship with said predetermined voltage;

(b) a third multiplier responsive to the output signal of said second multiplier for producing an output signal by multiplying the voltage of said output signal of said second multiplier by a predetermined value; and (c) a switching circuit for selectively transmitting the output signals of said second and third multipliers to said second adder in accordance with the output signal of said comparator.

* * * * *